United States Patent
Mukaiyama et al.

(10) Patent No.: US 8,446,618 B2
(45) Date of Patent: May 21, 2013

(54) INFORMATION MANAGEMENT DEVICE, METHOD OF MANAGING INFORMATION, AND PROGRAM

(75) Inventors: Masanori Mukaiyama, Minamiminoua-mura (JP); Masashi Asakawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1441 days.

(21) Appl. No.: 12/099,569

(22) Filed: Apr. 8, 2008

(65) Prior Publication Data

US 2008/0246995 A1 Oct. 9, 2008

(30) Foreign Application Priority Data

Apr. 9, 2007 (JP) .................................. 2007-101611

(51) Int. Cl.
 *G06F 3/12* (2006.01)
(52) U.S. Cl.
 USPC ............ 358/1.15; 358/1.13; 358/1.14; 714/1; 714/2; 714/4.1; 714/48; 714/55
(58) Field of Classification Search
 USPC .............. 358/1.13, 1.14, 1.15, 1.16; 714/100, 714/1, 2, 4.1, 4.2, 38.12, 48, 55
 See application file for complete search history.

(56) References Cited

U.S. PATENT DOCUMENTS

| 2003/0090716 A1 | 5/2003 | Umebayashi |
| 2004/0185877 A1* | 9/2004 | Asthana et al. ............ 455/456.6 |
| 2004/0218212 A1* | 11/2004 | Jang et al. .................... 358/1.15 |
| 2005/0146758 A1* | 7/2005 | Tsuchihashi .................. 358/506 |
| 2005/0162693 A1* | 7/2005 | Torii ............................ 358/1.15 |

FOREIGN PATENT DOCUMENTS

| JP | 10-200680 A | 7/1998 |
| JP | 11-004222 A | 1/1999 |
| JP | 2002-259103 A | 9/2002 |
| JP | 2003-150466 A | 5/2003 |
| JP | 2004-046774 A | 2/2004 |
| JP | 2006-155505 A | 6/2006 |

* cited by examiner

*Primary Examiner* — Vu B Hang
(74) *Attorney, Agent, or Firm* — Sughrue Mion, PLLC

(57) ABSTRACT

An information management device that manages the processing result of a print job processed by a print device through a network includes an information acquisition unit, an information output unit, a time setting unit, and a polling unit that performs an acquisition polling process in which the information acquisition unit acquires information on the print job that has been completed from the print device at a time when the information acquisition unit acquires the information on the print completion from the print device before the set waiting time elapses after the information output unit outputs the print job to the print device, and performs a checking polling process in which the information acquisition unit checks the print device for completion information at a time when the set waiting time elapses in a state that the information acquisition unit does not acquire the completion information from the print device.

8 Claims, 4 Drawing Sheets

INFORMATION MANAGEMENT DEVICE, METHOD OF MANAGING INFORMATION, AND PROGRAM

BACKGROUND

1. Technical Field

The present invention relates to an information management device, a method of managing information, and a program.

2. Related Art

Among general information management devices, an information management device capable of generating a print log file in which actual printing processes of a printer are precisely reflected by performing a polling process for receiving MIB (management information base) information as a print job through a network at regular time intervals and prioritizing the MIB information for generating a print log file in a case where there are same items in the print log acquired from a client and the MIB information acquired from the printer has been proposed (for example, see JP-A-2002-259103).

However, in the information management device disclosed in JP-A-2002-259103, although the MIB information including information on the print processing result can be received assuredly by receiving the MIB information through a network at regular time intervals, printers should be monitored all the time, and accordingly, there are problems that the processing load of the information management device is high and the load on the network is high.

SUMMARY

An advantage of some aspects of the invention is that it provides an information management device, a method of managing information, and a program capable of reducing the load on the network and assuredly acquiring the print result from a print device.

The present invention employs the following means for achieving the above-described advantages.

According to a first aspect of the invention, there is provided an information management device that manages the processing result of a print job processed by a print device though a network. The information management device includes: an information acquisition unit that acquires information through the network; an information output unit that outputs information; a time setting unit that sets a waiting time that is a waiting time for acquiring information on print completion based on the print device and information on the print job; and a polling unit that performs an acquisition polling process in which the information acquisition unit acquires information on the print job that has been completed from the print device at a time when the information acquisition unit acquires the information on the print completion from the print device before the set waiting time elapses after the information output unit outputs the print job to the print device, and performs a checking polling process in which the information acquisition unit checks the print device for completion information at a time when the set waiting time elapses in a state that the information acquisition unit does not acquire the completion information from the print device.

In the information management device, a waiting time that is a waiting time for acquiring information on print completion is set based on the print device and information on the print job. In addition, an acquisition polling process in which information on the print job that has been completed is acquired from the print device is performed at a time when the information on the print completion is acquired from the print device before the set waiting time elapses after the print job is output to the print device, and a checking polling process in which the print device is checked for completion information is performed at a time when the set waiting time elapses in a state that the completion information is not acquired from the print device. In the information management device, since the polling process is performed after the completion information that is in a state, from which the print result can be acquired, is acquired from the print device, the load on the network can be reduced. In addition, since the checking polling process is performed after the waiting time elapses in a state that the completion information has not been acquired, the print result can be assuredly acquired from the print device.

In the information management device, it may be configured that the time setting unit acquires a print processing time of the print job based on the number of sheets to be printed which is included in the print job and information on the print process capability of the print device, acquires a preliminary time that is shorter than a print result maintaining time that is a time for the print device to maintain the print result, and set a value calculated by adding the print processing time and the preliminary time together to the waiting time, for setting the waiting time based on the print device and the information on the print job. In such a case, since the checking polling process is performed while the print device maintains the print result after the completion of the print process, the print result can be acquired from the print device more assuredly. Here, in the information on the print process capability, the number of printable sheets per unit time, a print time per unit sheet, or the like is included. In such a case, the time setting unit may set the waiting time based on the acquired print process capability and the acquired print result maintaining time after the information acquisition unit acquires the information on the print process capability of the print device and the print result maintaining time from the print device. In such a case, since the waiting time can be set more precisely, the print result can be acquired from the print device still more assuredly. In addition, the polling unit may perform the checking polling process each time when the preliminary time elapses when the completion information has not been able to be acquired by the checking polling process after the waiting time elapses in a state that the completion information is not acquired. In such a case, the preliminary time may be set based on a value acquired from dividing the print result maintaining time by a predetermined number, so that a plurality of the checking polling processes can be configured to be performed within the print result maintaining time.

In the information management device, the polling unit may perform, as the checking polling process, a checking polling process in which the print job of which the completion information has not been able to be acquired is checked and information on another print job having the print result of the print completion is acquired from the print device from which the completion information has not been able to be acquired. In such a case, since the print result stored in the print device can be reacquired by the checking polling process, the load on the network can be further reduced.

The information management device may further include: a print unit that outputs the print job to the print device by using the information output unit; an information storage unit that stores job management information that is information for managing information on the print job that has been output to the print device by the print unit; and a management control unit that reflects the print result acquired by the polling unit in the stored job management information. In such a case, since the print job is performed by using the job management information and the job management information is updated based on the acquired print result, the print job can be managed in an easy manner.

According to a second aspect of the invention, there is provided a method of managing information using an information management device that manages the processing result of a print job processed by a print device though a network. The method includes: (a) setting a waiting time that is a waiting time for acquiring information on print completion based on the print device and information on the print job; and (b) performing an acquisition polling process in which information on the print job that has been completed is acquired from the print device at a time when the information on the print completion is acquired from the print device before the waiting time set in the (a) elapses after the print job is output to the print device, and performs a checking polling process in which the print device is checked for completion information at a time when the waiting time set in the (a) elapses in a state that the completion information is not acquired from the print device.

In the method of managing information, a waiting time that is a waiting time for acquiring information on print completion is set based on the print device and information on the print job. In addition, an acquisition polling process in which information on the print job that has been completed is acquired from the print device is performed at a time when the information on the print completion is acquired from the print device before the set waiting time elapses after the print job is output to the print device, and a checking polling process in which the print device is checked for completion information is performed at a time when the set waiting time elapses in a state that the completion information is not acquired from the print device. Accordingly, since the polling process is performed after the completion information that is in a state, from which the print result can be acquired, is acquired from the print device, the load on the network can be reduced. In addition, since the checking polling process is performed after the waiting time elapses in a state that the completion information has not been acquired, the print result can be assuredly acquired from the print device. In the above-described method of managing information, various aspects of the above-described information management device may be employed. In addition, a step for implementing each function of the above-described method of managing information may be added.

According to a third aspect of the invention, there is provided a program for implementing the above-described method in one or a plurality of computers. The program may be recorded on a computer readable recording medium (for example, a hard disk, a ROM, an FD, a CD, a DVD, or the like) or may be transferred from a computer using a transmission medium (a network such as the Internet or a LAN) to another computer. In addition, the program may be sent and received in any form. When the program is executed in one computer or parts of the program are executed by a plurality of computers, the above-described method of managing information is performed, and thereby the same operations and advantages as those acquired from performing the method of managing information are acquired.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
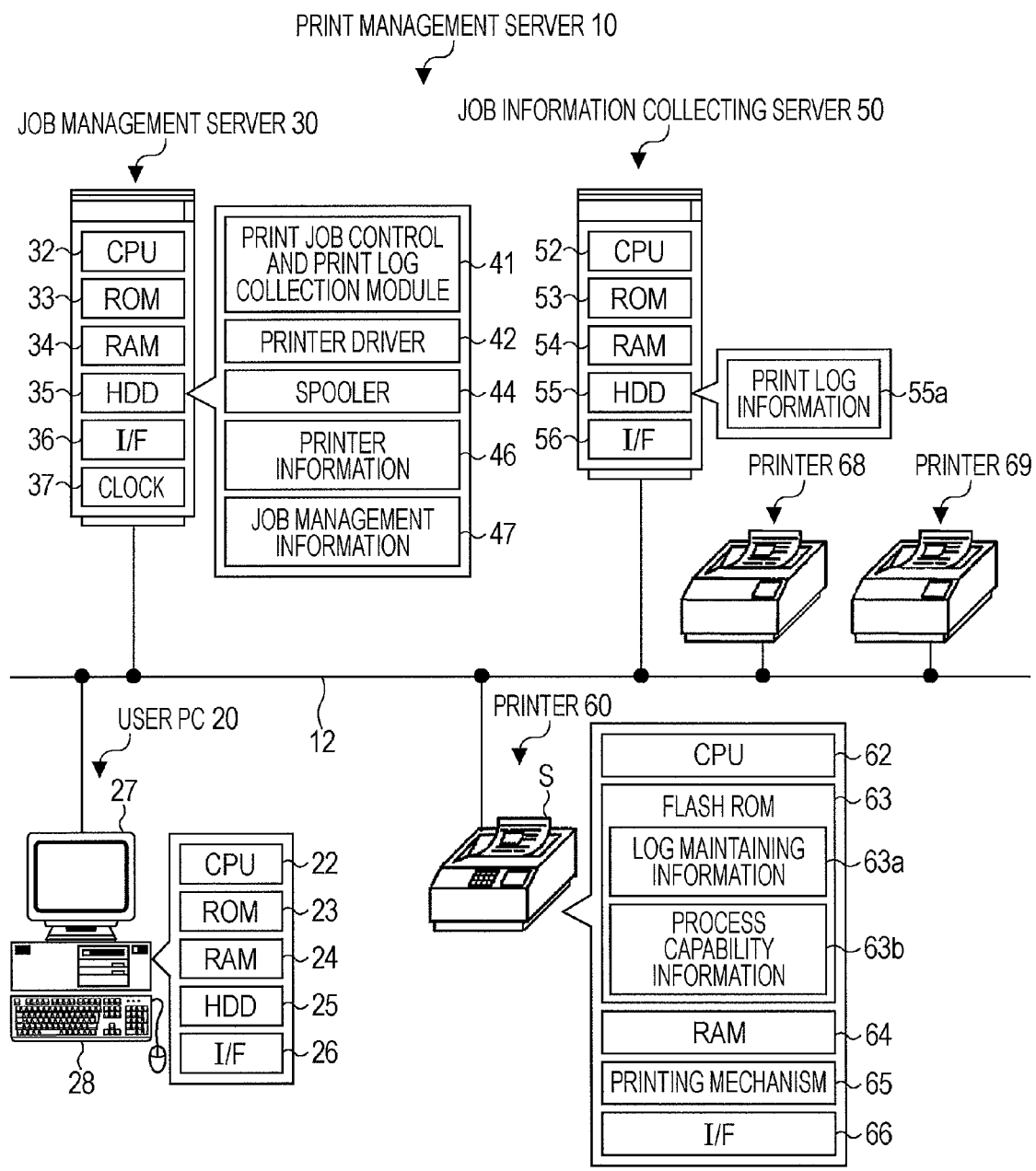
FIG. 1 is a schematic diagram showing the configuration of a print management system 10 according to an embodiment of the invention.
Figure 2:
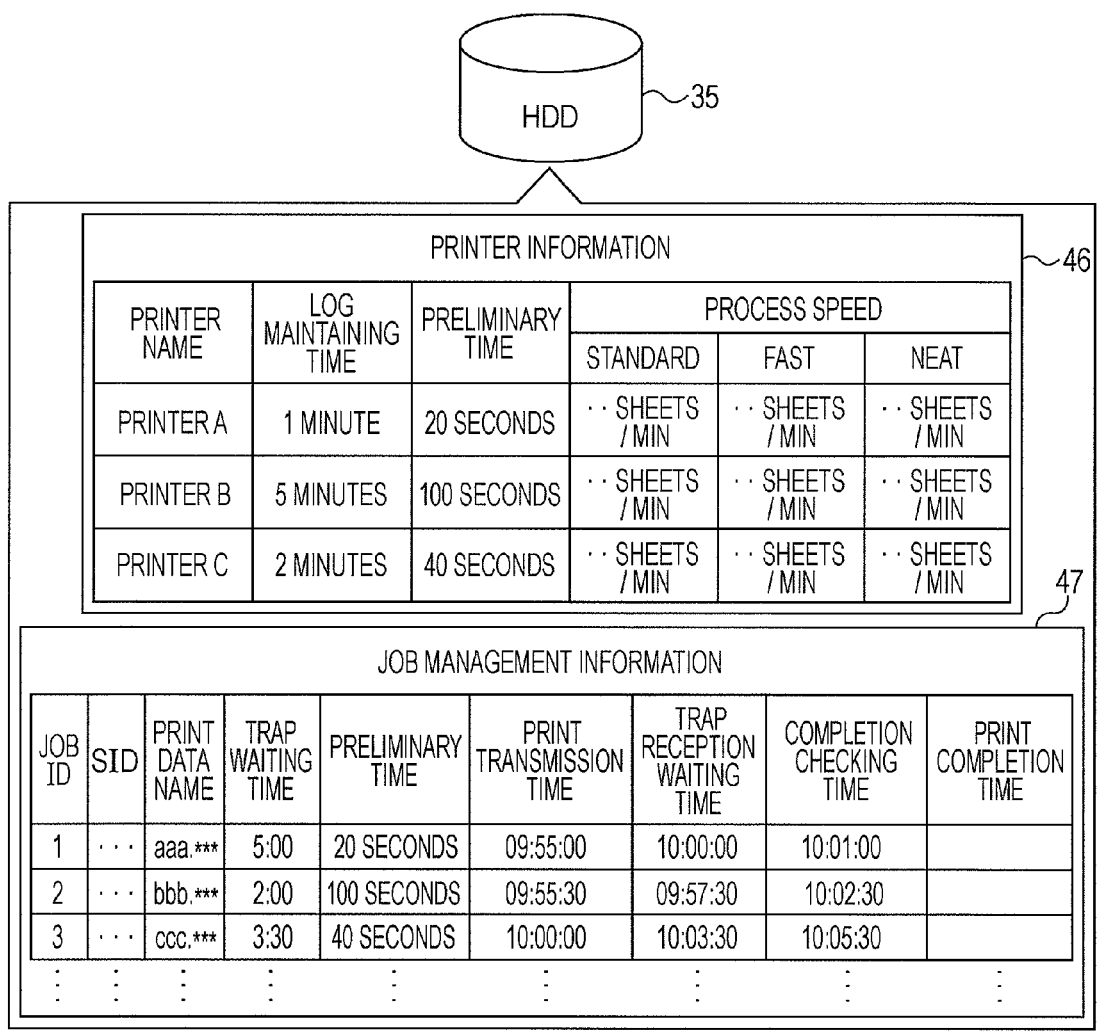
FIG. 2 is a diagram showing examples of printer information 46 and job management information 47 according to an embodiment of the invention.

FIG. 1 is a schematic diagram showing the configuration of a print management system 10 according to an embodiment of the present invention. FIG. 2 is a diagram showing printer information 46 and job management information 47 according to an embodiment of the invention that are stored in an HDD 35 included in a job management server 30. The print management system 10 according to this embodiment includes a user personal computer (hereinafter, referred to as a user PC) 20 that is connected to a LAN 12 as a network, a job management server 30 that is connected to the LAN 12, a job information colleting server 50 that is connected to the LAN 12, and a plurality of printers 60, 68, and 69 that are connected to the LAN 12. The print management system 10, although not shown in the figure, includes a plurality of other user PCs and a plurality of other printers. Any arbitrary numbers of the printers and the user PCs may be included in the print management system.

The user PC 20 is a known general-purpose computer configured as a process requesting device used by a user. The user PC 20 includes a CPU 22 that performs various control processes, a ROM 23 that stores various control programs, a RAM 24 that temporarily stores data, an HDD 25 that is a large-capacity memory for storing various application programs and various data files, a network interface (I/F) 26 that can transmit/receive signals between external devices connected to the LAN 12. The user PC 20 performs data transmission/reception for the job management server 30 and the like through the LAN 12 by using a reception buffer and a transmission buffer that are provided in a predetermined area of the RAM 24 through the I/F 26. The user PC 20 includes a display 27 that displays various information on a screen and an input device 28 such as a keyboard to which a user input various directions. The user PC 20 has a function for performing an operation in accordance with an input operation, for example, directing a print process for the job management server 30 in accordance with an installed program or reading out and displaying information such as print log information 55a stored in the job information collecting server 50 in a case where a user performs the input operation for a cursor or the like displayed in the display 27 through the input device 28.

The job management server 30 has a function of a print server that manages print jobs received from a user and performs the print jobs at each printer. The job management server 30 includes a CPU 32 that performs various control processes, a ROM 33 that stores various control programs, a RAM 34 that temporarily stores data, an HDD 35 that is a large-capacity memory for storing various application programs and various data files, an I/F 36 that can transmit or receive signals between external devices connected to the LAN 12, and a clock 37 that manages time. The CPU 32 is connected to the HDD 35, the I/F 36, and the like, so that information can be exchanged through a bus not shown in the figure. The job management server 30 uses a reception buffer and a transmission buffer that are provided in a predetermined area of the RAM 34 for performing data transmission/data reception to/from the user PC 20, the printer 60, or the like through the LAN 12. In the HDD 35, as shown in FIGS. 1 and 2, a print job control and print log collecting module 41 that receives a print job from the user PC 20 or the like, outputs the print job to a corresponding printer, and collects information on the result of printing, a printer driver 42 for generating print data that can be printed by a predetermined printer (for example, the printer 60), a spooler 44 that stores the print data and transmits the print data to a corresponding printer at a predetermined timing, printer information 46 that stores information on the printers, and job management information 47 as a management list, in which information on print jobs such as print data is stored, are stored.

In the printer information 46, as shown in FIG. 2, a printer name of each printer registered in the print management system 10, a log maintaining time (log maintaining information) that is a time for maintaining the result of a print process after the print process is completed, a preliminary time as a waiting margin that is calculated based on the log maintaining time, a process speed (process capability information) that is determined based on the printing conditions, and the like are stored. In the job management information 47, information including each job ID that is assigned by the job management server 30, a submission ID (also referred to as an SID) that is assigned to each print job as specific identification information other than the job ID, a print data name that is a name of data directed to be printed by each transmission source (for example, the user PC 20), a trap waiting time that is a time for waiting for reception of a trap from a printer which is information indicating the completion of the print process, a preliminary time that corresponds to each print job, a print transmission time that is a time when each print job is transmitted to be output to any one of the printers by the spooler 44, a trap reception waiting time that is a time until reception of the trap is waited, a checking completion time that is a time when the checking polling process for checking the print status after the trap reception waiting time is completed, a print completion time that is a time when the print process is completed, and the like are stored. In the job management server 30, as a structure for managing the above-described information, MIB information used for SNMP (Simple Network Management Protocol) is used. As the SID, information including a user name of each user who directs printing, a document name for which printing is directed, time at which conversion into print data is performed, and the like are configured to be generated as a combined text string.

The job information collecting server 50 manages print logs that are information on results of printing. The job information collecting server 50 includes a CPU 52 that performs various control operations, a ROM 53 that stores various control programs, a RAM 54 that temporarily stores data, an HDD 55 that is a large-capacity memory for storing various application programs and various data files, and an I/F 56 that can transmit/receive signals between external devices connected to the LAN 12. The CPU 52 is connected to the HDD 55, the I/F 56, and the like, so that information can be exchanged through a bus not shown in the figure. The job information collecting server 50 uses a reception buffer and a transmission buffer that are provided in a predetermined area of the RAM 54 for performing data transmission or data reception for the user PC 20, the printer 60, or the like through the LAN 12. In the HDD 55, users and print log information 55a that is information on the result of print process using each printer are stored. The print log information 55a is configured to be readable in accordance with an access from a user.

The printer 60 is a device that prints the print data acquired through the LAN 12 on a recording sheet S. The printer 60 includes a CPU 62 that is responsible for controlling the overall operations of the device, a flash ROM 63 that stores various process programs and is readable and writable, a RAM 64 that temporarily stores data, a printing mechanism 65 that prints on the recording sheet S using a toner as a coloring agent, and an I/F 66 that can transmit or receive signals to/from external devices connected to the LAN 12. In the flash ROM 63, log maintaining information 63a including a time for maintaining information on a print job for which a printing process has been completed, process capability information 63b that is the number of sheets printable per minute which corresponds to each print mode (for example, standard, speedy, neat, or the like), and the like are stored. The printing mechanism 65 is configured as a full-color electrophotographic type printing mechanism using a single photosensitive body and an intermediate transfer method. The printing mechanism 65 forms electrostatic latent images of images of each color which are formed by dividing an image into four colors of cyan (C), magenta (M), yellow (Y), and black (K) on photosensitive bodies, develops the electrostatic latent images by using toners of corresponding colors, transfers the developed toner images onto a recording sheet S through a transfer belt, and fixes the recording sheet S onto which the toner images have been transferred by applying heat and pressure. The printing mechanism 65 may use an ink jet method in which ink inside an ink cartridge is pressed by using a piezoelectric element or a heater disposed inside a print head so as to eject the ink toward the recording sheet S. Since the configurations of the printers 68 and 69 are the same as that of the printer 60, a description thereof is omitted here.

Figure 3:
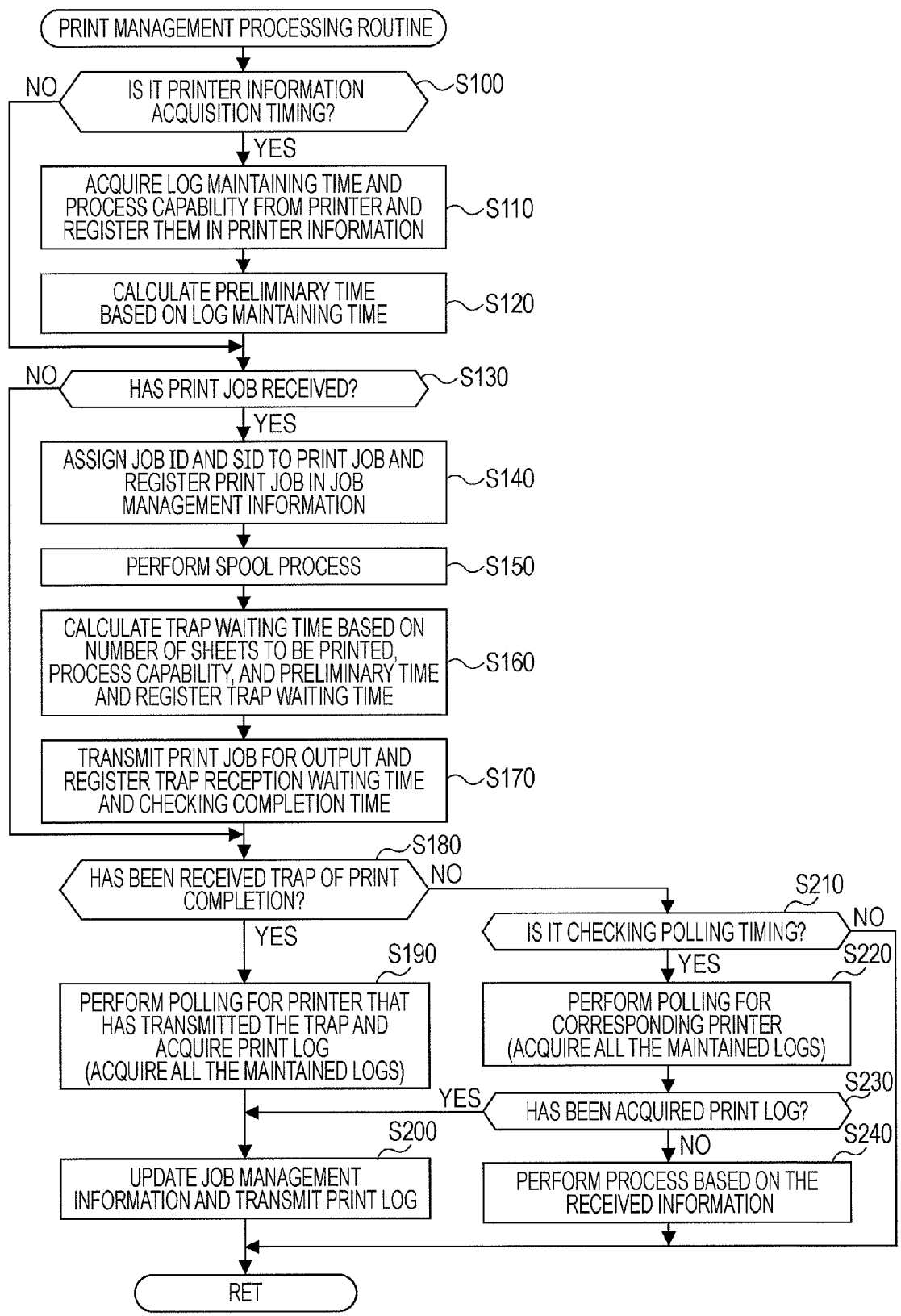
FIG. 3 is a flowchart showing an example of a print management processing routine according to an embodiment of the invention.

Next, the operation of the above-described print management system 10 according to this embodiment, and more particularly, operations from a time when a print direction is made by a user to a time when the print log is stored after the completion of the print process will be described. Here, as a detailed example, a case where a user A directs a printer 60 to perform a printing operation from a user PC 20 will be mainly described. FIG. 3 is a flowchart showing an example of a print management processing routine that is performed by the CPU 32 of the job management server 30. This routine is stored in the HDD 35 and is repeatedly performed after the operation of the job management server 30 is started.

When this routine is executed, the CPU 32, first, determines whether it is the timing for acquiring printer information (Step S100). Here, the CPU 32 is configured to determined that it is the timing for acquiring the printer information right after the operation of the job management server 30 is started or when there is a printer newly turned on after the operation of the job management server 30 is started 30. When determining that it is the timing for acquiring the printer information, the CPU 32 executes a polling (get) process of an SNMP for acquiring log maintaining information and process capability information. When receiving (acquiring) MIB information in which the above-described information is stored, the CPU 32 registers the received information in the printer information 46 stored in the HDD 35 (Step S110). Next, the CPU 32 acquires a preliminary time based on the acquired log maintaining time and registers the acquired preliminary time in the printer information 46 (Step S120). The preliminary time is determined based on the waiting time until the job management server 30 side performs a polling process for checking a print status for a printer and an interval of checking polling processes when the CPU 32 cannot receive a trap of the SNMP that is information indicating the completion of a printing process from the printer at a time when print processing time, which is a time for performing a printing process, of the printer elapses. In this embodiment, a value acquired by dividing the log maintaining time of each printer by a predetermined number (here, three) is set to the preliminary time for each printer, so that a plurality of the checking polling processes can be performed within the time (the log maintaining time) during which the printer maintains the result of the printing process. As described above, information on printers is registered in the printer information 46 before a print job is received.

After the process of Step S120 is performed or when the timing is determined not for acquiring the printer information in Step S100, the CPU 32 determines whether a print job has received (Step S130). When the print job is received, the CPU 32 assigns a job ID and an SID to the received print job and registers information (print data name and the like) that is included in the received print job in the job management information 47 (Step S140). Next, the CPU 32 performs a spool process for converting print target data included in the print job into print data by using a print driver corresponding to a designated printer that is included in the print job (Step S150).

Next, the CPU 32 calculates a trap waiting time based on the number of sheets to be printed which is included in the print job and the process speed and preliminary time which are stored in the printer information 46 of the printer designated for the printing process and registers the calculated trap waiting time and the preliminary time in the job management information 47 (Step S160). In this embodiment, the print processing time is acquired by dividing the number N of sheets to be printed by the process speed V that is the number of printable sheets of the printer per unit time, and the trap waiting time Tx, as shown in Equation (1), is calculated by adding the print processing time to the preliminary time Tp. Subsequently, the CPU 32 transmits the spooled print job to be output to the printer 60, sets the transmission time as print transmission time, acquires the trap reception waiting time by adding the trap waiting time to the print transmission time, acquires a checking completion time by adding the log maintaining time to the trap reception waiting time, and register the above-described time in the job management information 47 (Step S170). As described above, the CPU 32 transmits the received print job to be output to the printer and sets time intervals, time, and the like required for acquiring the result of the print process from the printer.

$$Tx(\text{seconds}) = N(\text{sheets}) \times 60/V(\text{sheets/min}) + Tp(\text{seconds}) \quad \text{Equation (1)}$$

Here, when receiving the print job, the printer 60 performs a print process by using the printing mechanism 65. At this moment, the print process is performed in the print processing time calculated by the job management server 30 on the whole. When the print process is completed, the printer 60 transmits a trap of print completion of the SNMP to be output to the job management server 30 through the I/F 66, generates a print log based on the result of the print process, and stores the generated print log in a predetermined area of the RAM 64 during the log maintaining time. In each print log, information such as a job ID and an SID that are assigned by the job management server 30, a user name and a host name of a user who directs printing, a printer name of a printer that performs the print process, names of ports for transmission and reception, a print data name, a print start time, a print completion time, the number of printed sheets, and the like is included.

After the process of Step S170 is performed or when the print job has not been received in Step S130, the CPU 32 determines whether a trap of print completion is received (acquired) from the printer (Step S180). When the trap of the print completion is received, the CPU 32 performs an acquisition polling process for the printer that has transmitted the trap of the print completion for acquiring the print log that is the result of the print process and acquires the print log (Step S190). At this moment, the CPU 32 searches for a print job of which print log has not been acquired from the printer that has sent the trap from among print jobs registered in the job management information 47 and an acquisition polling (get) process is performed also for the found print job. Then, the CPU 32 registers the content of the acquired print log in the job management information 47 and transmits the print log to be output to the job information collecting server 50 (Step S200), and completes this routine. As described above, the job management server 30 performs the acquisition polling process so as to acquire the print log after the trap is received.

On the other hand, when the trap of print completion has not been received in Step S180, the CPU 32 determines whether it is the timing for a checking polling process for checking the print status of a printer for which the trap reception waiting time has elapsed (Step S210). The determination on whether it is the timing for a checking polling process is performed based on whether there is a printer for which the trap reception waiting time stored in the job management information 47 has elapsed and whether there is a printer for which the preliminary time has elapsed after the elapse of the trap reception waiting time. In addition, it is determined to be the timing for performing the checking polling process each time the preliminary time has elapsed after the elapse of the trap reception waiting time until the checking completion time is reached. When it is not the timing for performing the checking polling process, the CPU 32 immediately completes this routine. On the other hand, when it is the timing for performing the checking polling process, the CPU 32 performs the checking polling (get) process for the printer that has printed the print job for which the timing for the checking polling process has reached (Step S220). Here, in the SNMP, since a UDP (User Datagram Protocol) is used and whether data (packet) has arrived at the destination is not checked, there is a case where the trap of the SNMP does not reach the job management server 30. In consideration of such a case, a configuration in which the job management server 30 performs a regular polling (for example, output of get for each 10 seconds) process so as to acquire information may be considered. However, in this print management system 10, when the print processing time and the preliminary time elapse in a status that the trap is not received after the print job is transmitted, it is determined that there is missing of arrival of the trap, and thus the checking polling process for the printer is performed. In the checking polling process, similar to the above-described acquisition polling process, a polling process for acquiring a print job of which print log has not been acquired is performed. When the print log of the print job to be checked is stored in the RAM 64, the printer 60 that has received the checking polling stores the print log in the MIB information of the SNMP and transmits the print log to be output to the job management server 30. On the other hand, when the print process is not completed or there is not a corresponding print log, the printer 60 transmits information indicating the status to be output. In addition, when the print log of another print job is stored in the RAM 64, the printer 60 transmits the print log to be output to the job management server 30. In addition, for example, when the print process has been stopped due to a trouble (for example, jam of a recording sheet S or the like), the printer 60 determines that the print process has been completed, generates a print log indicating the status, and stores the print log in the RAM 64.

Subsequently, the CPU 32 determines whether the print log has been acquired (Step S230). When the print log has been received, the CPU 32 performs the process of Step S200 and processes thereafter and completes this routine. On the other hand, when the print log has not been acquired, the CPU 32 performs a process on the basis of the information received from the printer 60 (Step S240) and completes this routine. In Step S240, for example, when the CPU 32 acquires information indicating that the printer is in the process of printing from the printer 60, the CPU 32 updates the job management information 47 such that a checking polling process is performed after the preliminary time elapses. On the other hand, when acquiring information indicating that there is no print log, the CPU 32 registers the information indicating that there is no print log in the job management information 47 and transmits the information to the job information collecting server 50. As described above, the CPU 32 waits for reception of a trap until a trap waiting time determined based on the print processing time and the log maintaining time elapses. Then, when the trap waiting time elapses, the CPU 32 performs the checking polling process for aggressively acquiring the print log.

Figure 4:
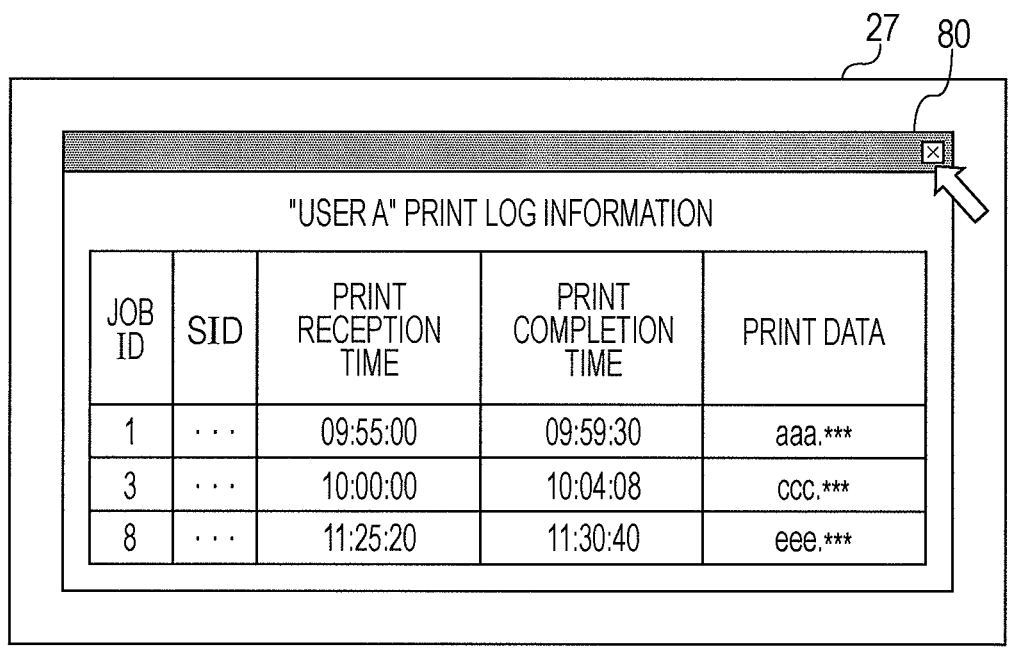
FIG. 4 is a diagram showing an example of a print log information display screen 80 according to an embodiment of the invention.

Thereafter, the job information collecting server 50 stores the received print log in the print log information 55a. Then, when a user accesses the job information collecting server 50 and reads out the print log information 55a, the CPU 22 downloads the content of the print log information 55a and displays a print log information display screen 80 on the display 27. FIG. 4 is a schematic diagram showing an example of the print log information display screen 80. In the print log information display screen 80, information on a print job that is directed to be printed by a user A, for example, information including a job ID, an SID, print reception time that is time at which the print process is directed, print completion time, a print data name, and the like is included. As described above, a user can check a print job that has been directed to be printed by the user later from the print log information display screen 80.

Here, the correspondence relationship between the constituent elements of this embodiment and the constituent elements according to the present invention will be clarified. The I/F 36 of this embodiment corresponds to the information acquisition unit and the information output unit according to the present invention. In addition, the CPU 32 of this embodiment corresponds to the time setting unit, the polling unit, the print unit, and the management control unit according to the present invention, and the HDD 35 corresponds to the information storage unit. In addition, the LAN 12 corresponds to the network, the trap waiting time corresponds to the waiting time, and the trap corresponds to the completion information. In this embodiment, by describing the operation of the print management system 10, an example of the information management method according to the present invention is clarified.

According to the print management system 10 described above in detail, the print processing time of a print job is acquired based on the number of sheets to be printed which is included in the print job and the process speed of the printer 60, a preliminary time that is smaller than a log maintaining time that is a time for the printer 60 to maintain the result of the print process is acquired, and a trap waiting time is acquired by summing the print processing time and the preliminary time. Then, when a trap of print completion is acquired from the printer 60 before the trap waiting time elapses after the print job is printed to the printer 60, an acquisition polling process for acquiring the print log of the print job is performed. On the other hand, when the trap waiting time elapses without acquisition of the trap from the printer 60, a checking polling process for checking the print status of the printer 60 is performed. Accordingly, the polling process is performed after the trap is acquired from the printer 60, and thereby it is possible to reduce the load on the network. In addition, since the checking polling process is performed after the trap waiting time elapses without acquiring the trap, the print log can be acquired from the printer 60 more assuredly. In addition, since the checking polling process is performed while the printer 60 maintains the result of the print process after the print process is completed, it is possible to acquire information on the result of the print process from the printer 60 more assuredly.

In addition, after the process speed of the printer 60 and the log maintaining time are acquired from the printer 60 in Step S110, the trap waiting time is set by using them, and accordingly, the trap waiting time can be set more accurately, and the information on the result of the print process can be acquired from the printer 60 more assuredly. In addition, when the completion information cannot be acquired by the checking polling process, the checking polling process is repeatedly performed each time when the preliminary time elapses, and accordingly, the information on the result of the print process can be acquired more assuredly. In addition, since the checking polling process for checking the print job of which trap cannot be acquired and acquiring print log of another print job from the printer 60 is performed, the print log stored in the printer 60 is reacquired by the checking polling process, and thereby it is possible to further reduce the load on the network. In addition, the print job is performed by using the job management information 47, and the job management information 47 is updated using the acquired print log, and thereby the print job can be managed in an easy manner.

The present invention is not limited to the above-described embodiments at all. It is apparent that the invention may be performed in various forms without departing from the technical scope of the invention.

For example, in the above-described embodiment, although the preliminary time is calculated based on the log maintaining time of each printer, however, a predetermined time (for example, 20 seconds) may be set as the preliminary time. In such a case, since a polling process for the print job is not performed until the trap waiting time elapses, the load on the network can be further reduced. In addition, in the above-described embodiment, although a value acquired by adding the print processing time and the preliminary time together is set as the trap waiting time, the print processing time may be set as the trap waiting time. In such a case, since a polling process for the print job is not performed until the trap waiting time elapses, the load on the network can be further reduced. In addition, in the above-described embodiment, although the checking polling process is performed each time when the preliminary time elapses, the checking polling process may be configured to be repeatedly performed each time when a time other than the preliminary time elapses. In addition, in the above-described embodiment, although the checking polling process is repeated until the checking completion time, the checking polling process may be configured to be repeated until information on the print completion is acquired. Alternatively, the checking polling process may be configured not to be repeated. In such a case, it is preferable that the checking polling process is performed at a timing close to the elapse of the log maintaining time.

In the above-described embodiment, although the log maintaining information and the process capability information are acquired each time when the operation of the job management server 30 is started or the operation of each printer is started, and the acquired information is stored in the printer information 46 to be used, however, the log maintaining information and the process capability information that are stored in the printer information 46 may be used when the information is registered in the system.

In the above-described embodiment, although a case where the processes for receiving print jobs, transmitting the print jobs to the printer, and receiving print log are performed for the whole jobs is described, however, one thread may be constructed for each print job, and the processes for transmitting a print job and receiving a print log may be performed for each print job. In such a case, same advantages as those of the above-described embodiment are acquired.

In the above-described embodiment, although the printer names, the log maintaining time, the preliminary time, the process speed, and the like are stored in the printer information 46, any one of the above-described items may be omitted, and other information may be configured to be stored in the printer information 46. In addition, although the job IDs, the SIDs, the print data names, the trap waiting time, the preliminary time, the print transmission time, the trap reception waiting time, the checking completion time, the print completion time, and the like are stored in the job management information 47, any one of the above-described items may be omitted, and other information may be configured to be stored in the job management information 47.

In the above-described embodiment, although the number of printable sheets per unit time is stored as the process speed in the printer information 46, a print time per unit sheet may be stored as the process speed in the printer information 46.

In the above-described embodiment, although the job management server 30 and the job information collecting server 50 are configured as separate servers, a server having all the functions thereof may be used. In addition, the server for transmitting a print job to be output to each printer and the server for collecting a print log from each printer may be configured as separate servers. In addition, in the above-described embodiment, although a printer 60 has been described, a FAX machine having a print function or a copier may be used. In addition, in the above-described embodiment, although the job management server 30 has been described as the information management device according to the invention, the invention may be embodied as a method of managing information or a program that performs a method of managing information.

The entire disclosure of Japanese Patent Application No. 2007-101611, filed Apr. 9, 2007 is expressly incorporated by reference herein.

What is claimed is:

1. An information management device that manages the processing result of a print job processed by a print device through a network, the information management device comprising:
   an information acquisition unit that acquires information through the network;
   an information output unit that outputs information;
   a time setting unit that sets a waiting time that is a waiting time for acquiring information on print completion based on the print device and information on the print job; and
   a polling unit that performs an acquisition polling process in which the information acquisition unit acquires information on the print job that has been completed from the print device at a time when the information acquisition unit acquires the information on the print completion from the print device before the set waiting time elapses after the information output unit outputs the print job to the print device, and performs a checking polling process in which the information acquisition unit checks the print device for completion information at a time when the set waiting time elapses in a state that the information acquisition unit does not acquire the completion information from the print device.

2. The information management device according to claim 1, wherein the time setting unit acquires a print processing time of the print job based on the number of sheets to be printed which is included in the print job and information on the print process capability of the print device, acquires a preliminary time that is shorter than a print result maintaining time that is a time for the print device to maintain the print result, and sets a value calculated by adding the print processing time and the preliminary time together to the waiting time, for setting the waiting time based on the print device and the information on the print job.

3. The information management device according to claim 2, wherein the time setting unit sets the waiting time based on the acquired print process capability and the acquired print result maintaining time after the information acquisition unit acquires the information on the print process capability of the print device and the print result maintaining time from the print device.

4. The information management device according to claim 2, wherein the polling unit performs the checking polling process each time when the preliminary time elapses when the completion information has not been able to be acquired by the checking polling process after the waiting time elapses in a state that the completion information is not acquired.

5. The information management device according to claim 1, wherein the polling unit performs, as the checking polling process, a checking polling process in which the print job of which the completion information has not been able to be acquired is checked and information on another print job having the print result of the print completion is acquired from the print device from which the completion information has not been able to be acquired.

6. The information management device according to claim 1, further comprising:
   a print unit that outputs the print job to the print device by using the information output unit;
   an information storage unit that stores job management information that is information for managing information on the print job that has been output to the print device by the print unit; and
   a management control unit that reflects the print result acquired by the polling unit in the stored job management information.

7. A method of managing information using an information management device that manages the processing result of a print job processed by a print device though a network, the method comprising:
   (a) setting a waiting time that is a waiting time for acquiring information on print completion based on the print device and information on the print job; and
   (b) performing an acquisition polling process in which information on the print job that has been completed is acquired from the print device at a time when the information on the print completion is acquired from the print device before the waiting time set in the (a) elapses after the print job is output to the print device, and performs a checking polling process in which the print device is checked for completion information at a time when the waiting time set in the (a) elapses in a state that the completion information is not acquired from the print device.

8. A non-transitory computer readable medium having stored thereon a program for implementing the method according to claim 7 in one or a plurality of computers.

\* \* \* \* \*